United States Patent
Chen et al.

(10) Patent No.: US 9,989,432 B2
(45) Date of Patent: Jun. 5, 2018

(54) IMPEDANCE SENSOR AND ELECTRONIC APPARATUS USING THE SAME

(71) Applicants: PROLIFIC TECHNOLOGY INC., Taipei (TW); UniSense Technology Co., Ltd, Hsinchu (TW)

(72) Inventors: Chiung-An Chen, Hsinchu (TW); Yun-Kuo Lee, Hsinchu (TW); Chih-Yuan Hung, Hsinchu (TW); Jia-Chun Huang, Hsinchu (TW); Yeow-Chin Chen, Hsinchu (TW); Shu-Fan Wu, Hsinchu (TW)

(73) Assignees: PROLIFIC TECHNOLOGY INC., Taipei (TW); UniSense Technology Co., Ltd, Hsinchu (TW)

( * ) Notice: Subject to any disclaimer, the term of this patent is extended or adjusted under 35 U.S.C. 154(b) by 206 days.

(21) Appl. No.: 15/216,698

(22) Filed: Jul. 22, 2016

(65) Prior Publication Data

US 2017/0023428 A1    Jan. 26, 2017

(30) Foreign Application Priority Data

Jul. 22, 2015    (TW) .............................. 104123661 A

(51) Int. Cl.
*G01L 9/00*      (2006.01)
*G01L 19/00*     (2006.01)
(Continued)

(52) U.S. Cl.
CPC ............ *G01L 9/025* (2013.01); *G01L 9/0052* (2013.01)

(58) Field of Classification Search
CPC . G01L 9/00; G01L 9/0052; G01L 9/02; G01L 9/025; G01L 9/04; G01L 9/045;
(Continued)

(56) References Cited

U.S. PATENT DOCUMENTS 5,042,307 A * 8/1991 Kato ..................... G01L 1/2281
                                                            73/708
2004/0245585 A1* 12/2004 Johnson ................... G01L 9/06
                                                            257/414

(Continued)

FOREIGN PATENT DOCUMENTS

CN            101865748        10/2010
JP       WO 2015133128 A1 *    9/2015    ........... G01L 9/0054

*Primary Examiner* — Nguyen Ha
(74) *Attorney, Agent, or Firm* — JCIPRNET

(57) ABSTRACT

An impedance sensor and an electronic apparatus using the same are provided. The impedance sensor includes an impedance-bridge circuit, a compensation circuit, and a signal processing circuit. The impedance-bridge circuit has an input side and an output side, and configured to generate a first impedance variation in response to a physical pressure. The compensation circuit is coupled to the input side of the impedance-bridge circuit in parallel, and configured to generate a second impedance variation in response to an environment temperature. The signal processing circuit respectively detects the first and the second impedance variations, and accordingly generates a first sensing signal indicating the first impedance variation and a second sensing signal indicating the second impedance variation, so as to compensate a temperature shift part of the first sensing signal by the second sensing signal and accordingly generate a pressure detection signal.

16 Claims, 6 Drawing Sheets

(51) Int. Cl.
*G01L 19/04* (2006.01)
*G01L 9/02* (2006.01)

(58) Field of Classification Search
CPC ... G01L 9/06; G01L 9/065; G01L 9/08; G01L 19/00; G01L 19/04; G01L 19/12; G01L 27/00
See application file for complete search history.

(56) References Cited

U.S. PATENT DOCUMENTS

2016/0231187 A1\* 8/2016 Wosnitza ................ G01L 19/04
2016/0349132 A1\* 12/2016 Hasegawa ............... G01L 9/045

\* cited by examiner

IMPEDANCE SENSOR AND ELECTRONIC APPARATUS USING THE SAME

CROSS-REFERENCE TO RELATED APPLICATION

This application claims the priority benefit of Taiwan application serial no. 104123661, filed on Jul. 22, 2015. The entirety of the above-mentioned patent application is hereby incorporated by reference herein and made a part of this specification.

BACKGROUND OF THE INVENTION

Field of the Invention

The invention relates to a sensor and an application thereof, and more particularly, to an impedance sensor and an electronic apparatus using the same.

Description of Related Art

An impedance sensor is an apparatus that detects an impedance variation in response to a physical pressure, such as a piezoresistive sensor. With use of the impedance sensor, the electronic apparatus can detect the physical pressure applied thereon and accordingly execute a corresponding control operation.

In modern automobile industry, petrochemical industry or the electronics industry, a control system usually needs to use a pressure sensor to detect conditions regarding how certain apparatuses endure the physical pressure, so as to execute a corresponding control mechanism. Therefore, the impedance sensor needs to provide a pressure detection capability with a favorable accuracy in general.

However, in the existing technology, a circuit scheme of the impedance sensor is usually constituted by passive components. Because component characteristics of the passive components can easily be influenced by an environmental temperature variation, a shift may occur on a sensing output of the impedance sensor due to the temperature variation, resulting in difficulties in effectively improving detection sensibility and resolution of the impedance sensor.

SUMMARY OF THE INVENTION

The invention is directed to an impedance sensor and an electronic apparatus using the same, which are capable of solving the problems mentioned in Description of Related Art.

The impedance sensor of the invention includes an impedance-bridge circuit, a compensation circuit, and a signal processing circuit. The impedance-bridge circuit has an input side and an output side, and configured to generate a first impedance variation in response to a physical pressure. The compensation circuit is coupled to the input side of the impedance-bridge circuit in parallel, and configured to generate a second impedance variation in response to an environment temperature. The signal processing circuit is coupled to the impedance-bridge circuit and the compensation circuit, and configured to respectively detect the first and the second impedance variations and accordingly generate a first sensing signal indicating the first impedance variation and a second sensing signal indicating the second impedance variation. The signal processing circuit performs a signal process according to the first and the second sensing signals, so as to compensate a temperature shift part of the first sensing signal by the second sensing signal and accordingly generate a pressure detection signal.

In an embodiment of the invention, the impedance-bridge circuit includes first to fourth impedance components. A first terminal of the second impedance component is coupled to a second terminal of the first impedance component. A first terminal of the third impedance component is coupled to a first terminal of the first impedance component. A first terminal of the fourth impedance component is coupled to a second terminal of the third impedance component, and a second terminal of the fourth impedance component is coupled to a second terminal of the second impedance component. The second terminal of the first impedance component and the second terminal of the third impedance component are the input side, and the first terminal of the first impedance component and the second terminal of the second impedance component are the output side.

In an embodiment of the invention, the compensation circuit includes a compensation impedor. A first terminal of the compensation impedor is coupled to the second terminal of the first impedance component and the first terminal of the second impedance component, and a second terminal of the compensation impedor is coupled to the second terminal of the third impedance component and the first terminal of the fourth impedance component.

In an embodiment of the invention, the signal processing circuit includes a first detecting unit, a second detecting unit and a compensation calculating unit. The first detecting unit is coupled to the output side, and configured to detect the first impedance variation and accordingly generate the first sensing signal. The second detecting unit is coupled to the compensation circuit, and configured to detect the second impedance variation and accordingly generate the second sensing signal. The compensation calculating unit is coupled to the first detecting unit and the second detecting unit, and configured to generate the pressure detection signal according to the first and the second sensing signals.

In an embodiment of the invention, the impedance sensor further includes a detection carrier. The detection carrier has a sensing region and a non-sensing region. The sensing region is influenceable by the physical pressure, and the non-sensing region is not influenceable by the physical pressure, wherein the impedance-bridge circuit is disposed within the sensing region.

In an embodiment of the invention, the compensation circuit is disposed within the non-sensing region.

In an embodiment of the invention, the compensation circuit is disposed within the sensing region, and the signal processing circuit further performs a correcting operation according to the second sensing signal to correct a pressure detection part included by the second impedance variation and then generate the pressure detection signal according to the first sensing signal and the second sensing signal that is corrected by the correcting operation.

In an embodiment of the invention, the detection carrier is one of a printed circuit board and a micro-electro-mechanical system.

An electronic apparatus of the invention includes an impedance sensor, a processing unit and at least one function module. The impedance sensor includes an impedance-bridge circuit, a compensation circuit, and a signal processing circuit. The impedance-bridge circuit has an input side and an output side, and configured to generate a first impedance variation in response to a physical pressure. The compensation circuit is coupled to the input side of the impedance-bridge circuit in parallel, and configured to generate a second impedance variation in response to an environment temperature. The signal processing circuit is coupled to the impedance-bridge circuit and the compensation circuit, and configured to respectively detect the first and the second impedance variations and accordingly generate a first sensing signal indicating the first impedance variation and a second sensing signal indicating the second impedance variation. The signal processing circuit performs a signal process according to the first and the second sensing signals, so as to compensate a temperature shift part of the first impedance variation by the second impedance variation and accordingly generate a pressure detection signal. The processing unit is coupled to the impedance sensor to receive the pressure detection signal, and configured to serve as an operation core of the electronic apparatus, wherein the processing unit generates a control signal according to the pressure detection signal. The function module is coupled to the processing unit, and configured to execute a corresponding function according to the control signal.

Based on the above, the invention proposes an impedance sensor and an electronic apparatus using the same, which are capable of detecting the impedance variation of the compensation circuit in order to compensate the temperature shift of the impedance-bridge circuit, so that the impedance sensor can generate the pressure detection signal that is not influenced by the environment temperature variation. Further, because the impedance sensor of the present application uses the circuit configuration coupled in parallel to the impedance-bridge circuit to realize the temperature shift compensation, no additional voltage drop will be generated by overall operations of the impedance sensor, so as to improve detection sensitivity and resolution of the impedance sensor.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The following will describe some embodiments as examples of the invention. However, it should be noted that the invention is not limited to the disclosed embodiments. Moreover, some embodiments may be combined where appropriate. The term "couple" used throughout this specification (including the claims) may refer to any direct or indirect connection means. For example, if it is described that the first device is coupled to the second device, it should be understood that the first device may be directly connected to the second device or indirectly connected to the second device through other devices or certain connection means.

Figure 1:
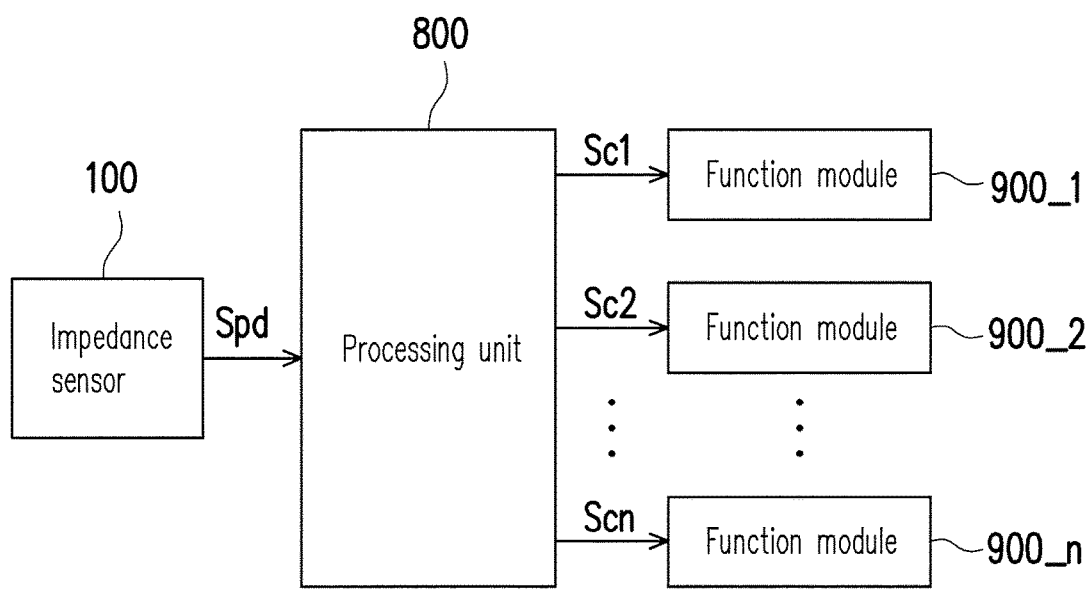
FIG. 1 is a functional block diagram illustrating an electronic apparatus according to an embodiment of the invention.

FIG. 1 is a functional block diagram illustrating an electronic apparatus according to an embodiment of the invention. An electronic apparatus 10 of the present embodiment may be, for example, an electronic apparatus that executes a corresponding operational function (e.g., displaying pressure readings, determining an air inflation control mechanism, executing a touch detection, etc.) by detecting a physical pressure, such as a water pressure detection apparatus, a blood pressure detection apparatus, an oil pressure detection apparatus, a tire pressure detection apparatus, an inflation system, an accelerometer, an impedance touch panel, a notebook computer, a tablet computer, a smart phone, a personal digital assistant (PDA) or game console using an impedance touch technology, but the invention is not limited to the above. Referring to FIG. 1, the electronic apparatus 10 includes an impedance sensor 100, a processing unit 800 and at least one function module (function modules 900_1 to 900_n are used herein as an example, wherein n is a positive integer greater than 1).

The impedance sensor 100 may be used to detect a physical pressure (e.g., water pressure, oil pressure, air pressure or pressure by object contacts) applied on the electronic apparatus 10 by a substance (which may be gas, liquid or solid), and accordingly generate a pressure detection signal Spd. The processing unit 800 is a control core of the electronic apparatus 10, and configured to control operations of the function modules 900_1 to 900_n. The function modules 900_1 to 900_n are hardware parts capable of providing specific operational functions to the electronic apparatus 10. For instance, the function modules 900_1 to 900_n may be, for example, a display panel module for providing display functions, a memory module, a hard disk and so on, but types of function modules 900_1 to 900_n are not particularly limited in the present application.

Specifically, the processing unit 800 of the present embodiment can receive the pressure detection signal Spd indicating the physical pressure of the substance applied on the electronic apparatus 10 from the impedance sensor 100, and accordingly generate corresponding control signals Sc1 to Scn according to the pressure detection signal Spd to control the operations of the function modules 900_1 to 900_n. For instance, it is assumed that the electronic apparatus 10 is the water pressure detection apparatus and the function module 900_1 is the display panel module. In this case, the water pressure detection apparatus can detect the water pressure by the impedance sensor 100, and accordingly generate the corresponding pressure detection signal Spd, so that the processing unit 800 may generate the corresponding control signals Sc1 to Scn according to the pressure detection signal Spd to control the display panel module for displaying current water pressure readings.

Herein, in comparison with the traditional impedance sensor, the impedance sensor 100 of the present application is capable of effectively compensating influences caused by the environmental temperature variation, such that pressure detection sensitivity and resolution of the impedance sensor 100 of the present application can be effectively improved to thereby improve application performance and accuracy of the pressure detection related to the electronic apparatus 10. A specific architecture and operations of an impedance sensor is provided below with reference to FIG. 2.

Figure 2:
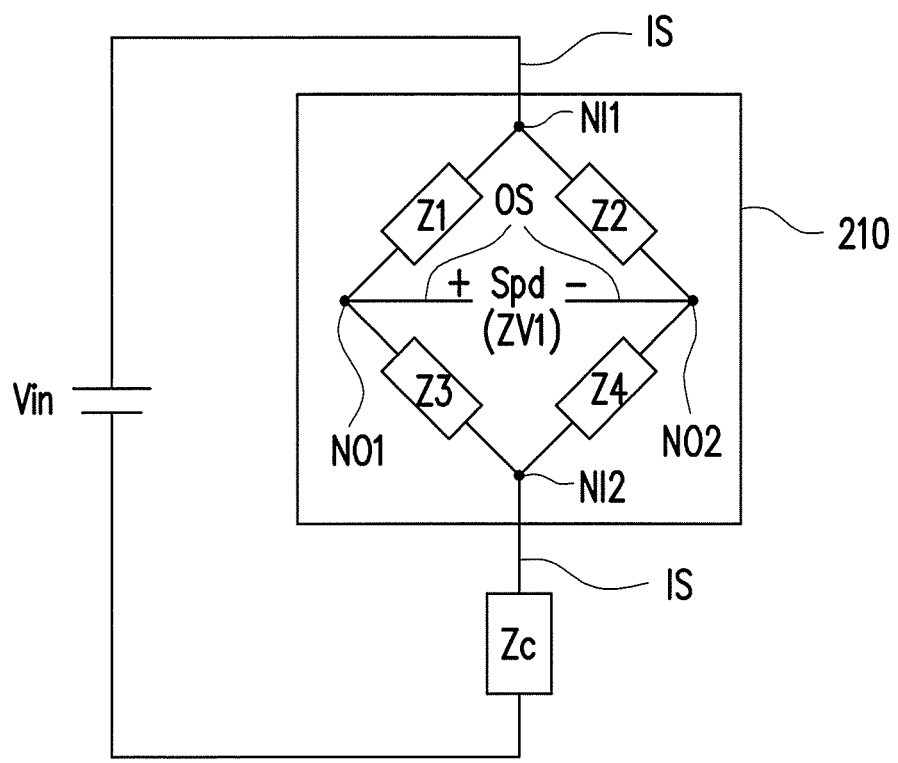
FIG. 2 is a functional block diagram illustrating an impedance sensor.

FIG. 2 is a functional block diagram illustrating an impedance sensor. Referring to FIG. 2, the impedance sensor 200 of the present embodiment includes an impedance-bridge circuit 210 and a compensation impedor Zc.

The impedance-bridge circuit 210 may be, for example, constituted by connecting a plurality of impedors Z1 to Z4 together in a Wheatstone bridge architecture. The impedance-bridge circuit 210 has an input side IS and an output side OS, wherein one terminal (i.e., a node NI1) of the input side IS is connected to a high potential terminal of an input voltage Vin, and the output side OS is configured to output the pressure detection signal Spd related to an impedance variation ZV1. Herein, the impedance-bridge circuit 210 can change equivalent impedance of the impedors Z1 to Z4 in response to the physical pressure applied to the impedance sensor 200. In addition, besides that the physical pressure can cause the equivalent impedance of the impedors Z1 to Z4 to change, the environmental temperature variation also causes the equivalent impedance of the impedors Z1 to Z4 to change. Therefore, the impedance variation ZV1 of the impedance-bridge circuit 210 at least includes an impedance variation caused by a physical pressure variation (hereinafter, also known as a "pressure detection part") and an impedance variation caused by the environmental temperature variation (hereinafter, also known as a "temperature shift part").

More specifically, because a part of the impedance variation ZV1 is usually caused by the environment temperature variation, the pressure detection signal generated based on the impedance-bridge circuit 210 alone is usually unable to accurately indicate the physical pressure applied thereon due to influences by the temperature shift part in the impedance variation ZV1.

To solve this problem, the impedance sensor 200 of the present embodiment is further disposed with a compensation impedor Zc. A first terminal of the compensation impedor Zc and another terminal (i.e., a node NI2) of the input side IS of the impedance-bridge circuit 210 are connected in series, and a second terminal of the compensation impedor Zc is connected to a low potential terminal of the input voltage Vin. The configuration of the compensation impedor Zc is capable of dispersing the influences of the temperature variation to the impedance variation of the impedance-bridge circuit 210, such that a degree of the equivalent impedance changed in response to the temperature variation can be lowered to compensate the temperature shift part of the pressure detection signal Spd.

However, in comparison with the architecture in which the pressure detection is performed based on the impedance-bridge circuit 210 alone, because the architecture in which the compensation impedor Zc is disposed results in additional voltage drop to the whole circuit, such voltage drop effect will cause detection sensitivity and resolution of the impedance sensor 200 to be reduced.

Figure 3:
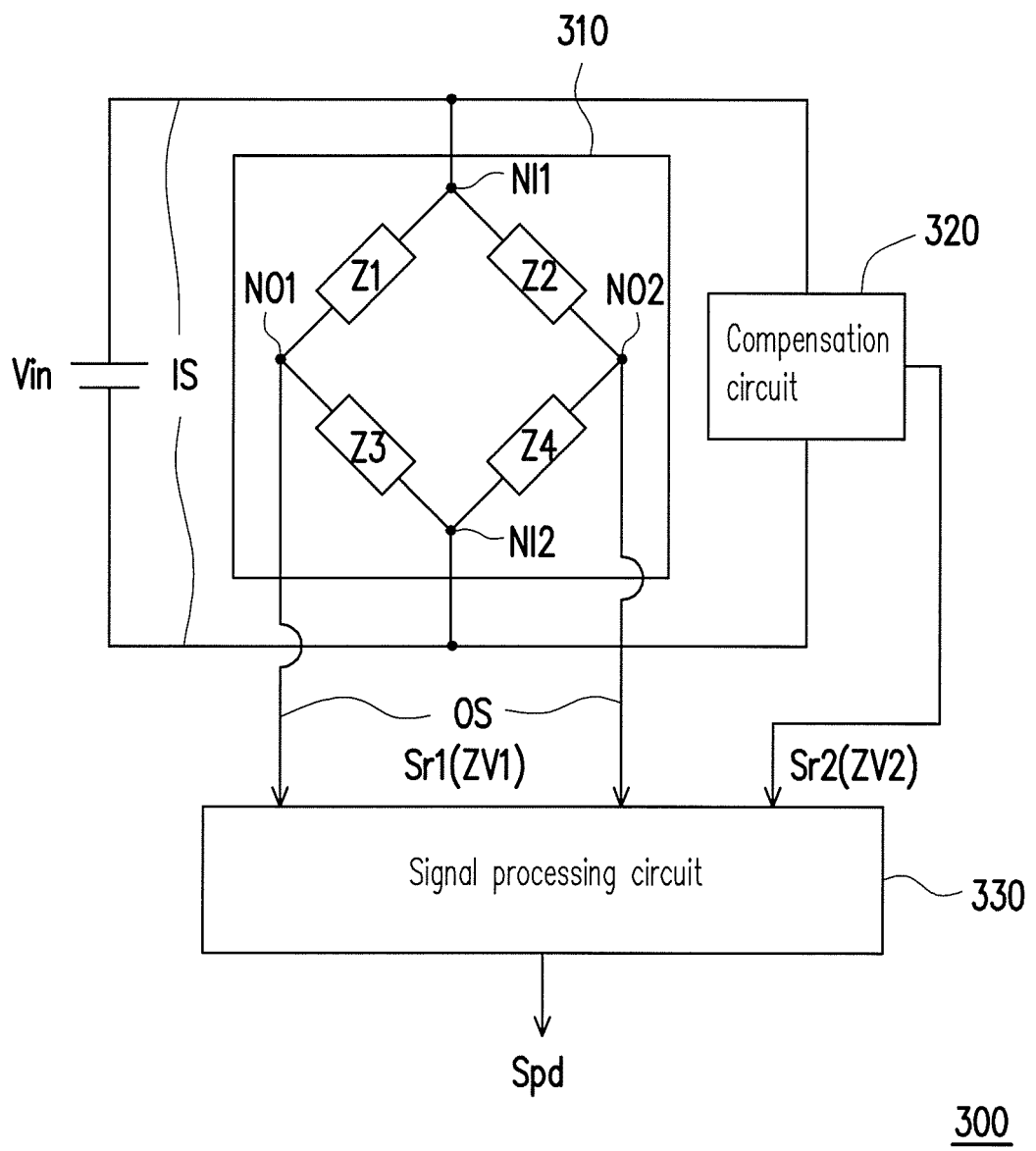
FIG. 3 is a block diagram illustrating an impedance sensor according to an embodiment of the invention.

Accordingly, in order to compensate the temperature shift of the impedance sensor in the premise without affecting detection sensitivity and resolution, an architecture of the impedance sensor 300 as shown in FIG. 3 is proposed by the present application. Herein, FIG. 3 is a block diagram illustrating an impedance sensor according to an embodiment of the invention.

Referring to FIG. 3, the impedance sensor 300 of the present embodiment includes an impedance-bridge circuit 310, a compensation circuit 320 and a signal processing circuit 330.

The impedance-bridge circuit 310 may be, for example, constituted by connecting a plurality of impedors Z1 to Z4 together in a Wheatstone bridge architecture. The impedance-bridge circuit 310 has an input side IS and an output side OS, wherein two terminals (i.e., nodes NI1 and NI2) of the input side IS are connected to a high voltage terminal and a low voltage terminal of the input voltage Vin respectively, and two terminals (i.e., node NO1 and NO2) of the output side OS are coupled to the signal processing circuit 330.

As similar to the foregoing embodiment of FIG. 2, the impedance-bridge circuit 310 of the present embodiment also generates an impedance variation ZV1 in response to the physical pressure applied to the impedance sensor 300 (i.e., causing the equivalent impedance of the impedors Z1 to Z4 to change). Further, because the impedance variation ZV1 of the impedance-bridge circuit 310 also changes in response to the environmental temperature variation, the impedance variation ZV1 of the present embodiment also at least includes a pressure detection part caused by the physical pressure and a temperature shift part caused by the environmental temperature variation.

The compensation circuit 320 is coupled to the input side IS of the impedance-bridge circuit 310 in parallel (coupled between the nodes NI1 to NI2). In the present embodiment, the compensation circuit 320 generates a corresponding impedance variation ZV2 in response to the environmental temperature variation. Herein, because the compensation circuit 320 is disposed on an adjacent region of the impedance-bridge circuit 310 (herein, so-called "adjacent region" refers to a region under the same environmental condition), and is constituted by components with component characteristics identical/similar to those of the impedors Z1 to Z4, the compensation circuit 320 of the present embodiment will provide temperature variation characteristics identical/similar to those of the impedance-bridge circuit 310.

The signal processing circuit 330 is coupled to the output side OS of the impedance-bridge circuit 310 and the compensation circuit 320. The signal processing circuit 330 can respectively detect the impedance variations ZV1 and ZV2 of the impedance-bridge circuit 310 and the compensation circuit 320 and accordingly generate sensing signals Sr1 and Sr2 respectively indicating the impedance variations ZV1 and ZV2. More specifically, in the premise where the input voltage Vin is fixed, the impedance variation ZV1 causes intensity of current flowed through the impedors Z1 to Z4 to change, and impedance components inside the compensation circuit 320 also generates a current variation in response to the impedance variation ZV2. In an exemplary embodiment, the signal processing circuit 330 can extract current or voltage inside the impedance-bridge circuit 310 and the compensation circuit 320 first and then perform an analog to digital conversion on the extracted current or voltage, so as to generate the sensing signals Sr1 and Sr2 indicating the impedance variations ZV1 and ZV2 (but the invention is not limited thereto, the current and voltage extracted from the impedance-bridge circuit 310 and the compensation circuit 320 may also be directly used as the sensing signals Sr1 and Sr2 indicating the impedance variations ZV1 and ZV2 in other embodiments).

Subsequently, the signal processing circuit 330 further performs a signal process on the sensing signals indicating the impedance variations ZV1 and ZV2, so as to compensate/eliminate the temperature shift part of the impedance variation ZV1 generated by impedance-bridge circuit 310 by using the impedance variation ZV2 generated by the compensation circuit 320 and accordingly generate the pressure detection signal Spd which indicates only the pressure detection part of the impedance variation.

In other words, the impedance sensor 300 of the present embodiment uses the compensation circuit 320 to generate the sensing signal Sr2 indicating the impedance variation ZV2 (which is related to the temperature variation) and accordingly compensates/eliminates the temperature shift part in the sensing signal Sr1 indicating the impedance variation ZV1. As such, the impedance sensor 300 of the present embodiment is also capable of realizing the function of temperature compensation as the same to the impedance sensor 200 of FIG. 2.

More specifically, because the compensation circuit 320 of the present embodiment is coupled to the input side IS of the impedance-bridge circuit 310 in parallel and the impedance variation of the compensation circuit 320 is detected and served as a reference for the compensation, the compensation circuit 320 will not cause the additional voltage to impedance-bridge circuit 310 under such configuration. Therefore, in comparison with the embodiment of FIG. 2, the impedance sensor 300 of the present embodiment will not cause the detection sensitivity of the impedance sensor 300 to reduce by the configuration of the compensation circuit 320. In other words, the architecture of the present embodiment is capable of compensating the temperature variation of the impedance sensor in the premise without affecting detection sensitivity and resolution, such that a detection performance of the impedance sensor 300 may be improved accordingly.

A circuit scheme and configuration environments of the impedance sensor are specifically described with reference to FIG. 4 to FIG. 5C.

Figure 4:
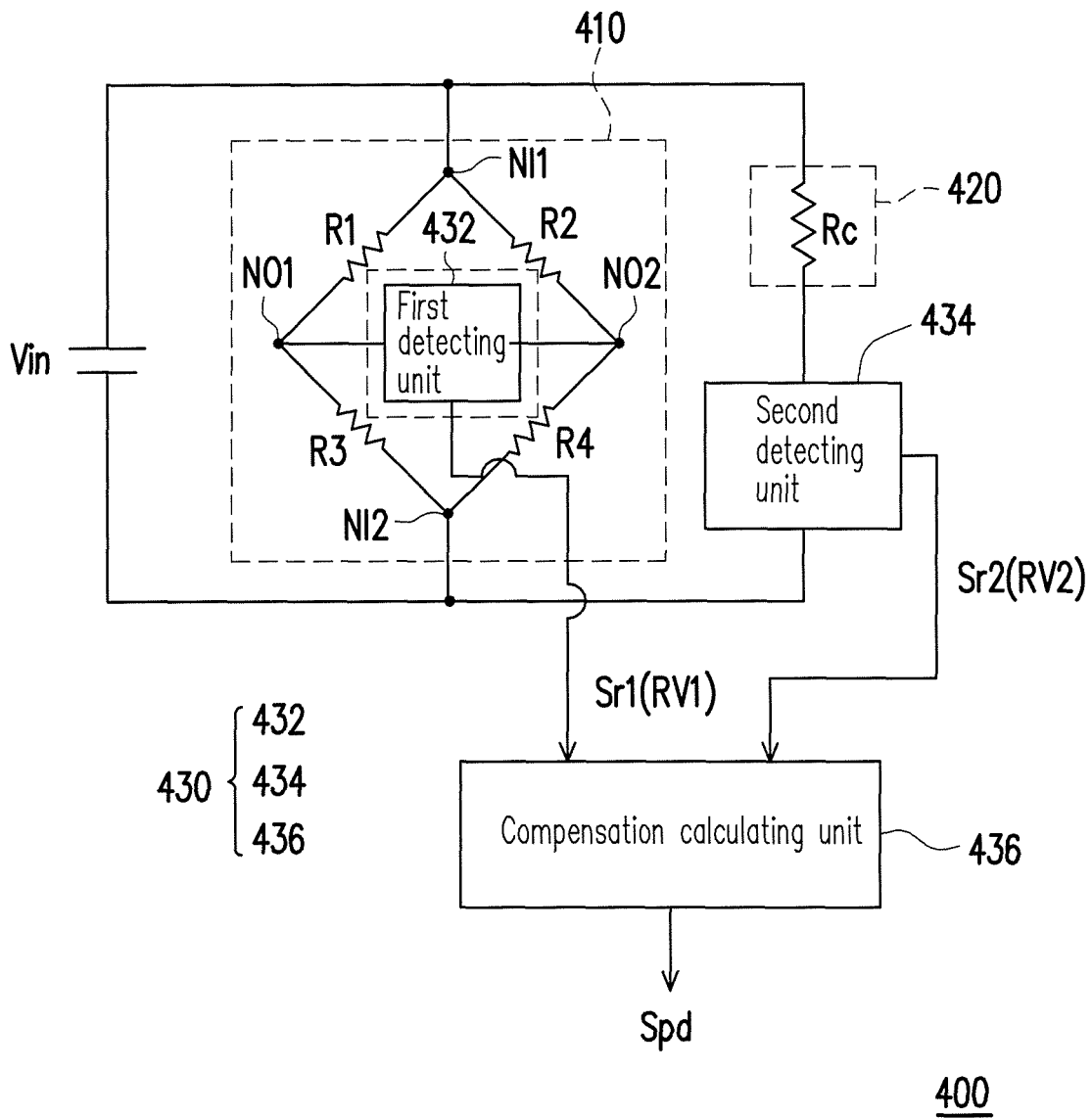
FIG. 4 is a schematic diagram illustrating a circuit scheme of an impedance sensor according to an embodiment of the invention.

FIG. 4 is a schematic diagram illustrating a circuit scheme of an impedance sensor according to an embodiment of the invention. An impedance sensor 400 of the present embodiment is implemented by using, for example, a piezoresistive sensor (i.e., resistors are used as the impedance components to detect the physical pressure), but the invention is not limited thereto. Referring to FIG. 4, the impedance-bridge circuit 410 includes resistors R1 to R4. The compensation circuit 420 includes a compensation resistor Rc. The signal processing circuit 430 includes a first detecting unit 432, a second detecting unit 434 and a compensation calculating unit 436.

In the impedance-bridge circuit 410, a first terminal of the resistor R1 is coupled to a first terminal of the resistor R3, a second terminal of the resistor R1 is coupled to a first terminal of the resistor R2, a second terminal of the resistor R2 is coupled to a second terminal of the resistor R4, and a second terminal of the resistor R3 is coupled to a first terminal of the resistor R4. In other words, the resistors R1 to R4 constitute one Wheatstone bridge, wherein a common node NI1 of the resistors R1 and R2 and a common node NI2 of the resistors R3 and R4 are used as the input side IS of the impedance-bridge circuit 410, and a common node NO1 of the resistors R1 and R3 and a common node NO2 of the resistors R2 and R4 are used as the output side OS of the impedance-bridge circuit 410.

In the compensation circuit 420, a first terminal of the compensation resistor Rc is coupled to the second terminal of the resistor R1 and the first terminal of the resistor R2 via the node NI1, and the second terminal of the compensation resistor Rc is coupled to the second terminal of the resistor R3 and the first terminal of the resistor R4 via the node NI2. In other words, the compensation resistor Rc and the impedance-bridge circuit 410 are connected in parallel, and the input voltage Vin crosses over the two terminals of the compensation resistor Rc.

In the signal processing circuit 430, the first detecting unit 432 is coupled to the output side OS of the impedance-bridge circuit 410. Herein, the first detecting unit 432 can detect an equivalent resistance variation RV1 of the resistors R1 to R4 by extracting voltage on the nodes NO1 and NO2 or extracting current flowed through the resistors R1 to R4, and accordingly generate a sensing signal Sr1.

The second detecting unit 434 is coupled to the compensation resistor Rc. Herein, the second detecting unit 434 can detect an equivalent resistance variation RV2 of the compensation resistor Rc by extracting the current flowed through the compensation resistor Rc, and accordingly generate a sensing signal Sr2. In the present embodiment, the compensation resistor Rc and the resistors R1 to R4 may be, for example, made of the same material and included with the same process parameters, so that the compensation resistor Rc and the resistors R1 to R4 can have similar resistance variations in response to the environmental temperature variation.

The compensation calculating unit 436 is coupled to the first detecting unit 432 and the second detecting unit 434. The compensation calculating unit 436 can perform a compensation calculation according to the sensing signal Sr1 received from the first detecting unit 432 and the sensing signal Sr2 received from the second detecting unit 434, so as to compensate the temperature shift part of the sensing signal Sr1 by the sensing signal Sr2. Subsequently, the compensation calculating unit 436 provides the signal processed by a filtering process as the pressure detection signal Spd to a back-end circuit.

Figure 5A:
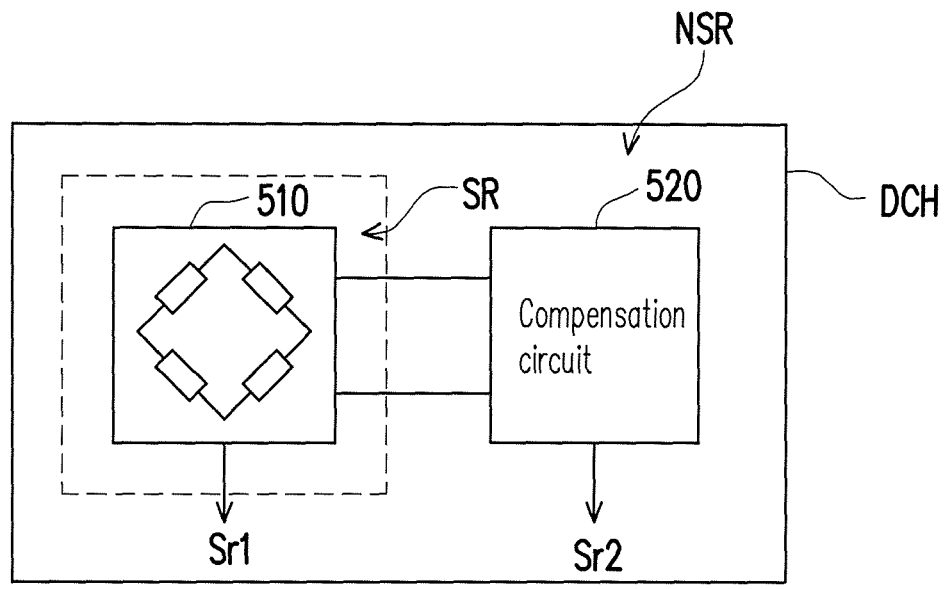
FIG. 5A to FIG. 5C are schematic diagrams illustrating configurations of the impedance sensors according to different embodiments of the invention.
Figure 5B:
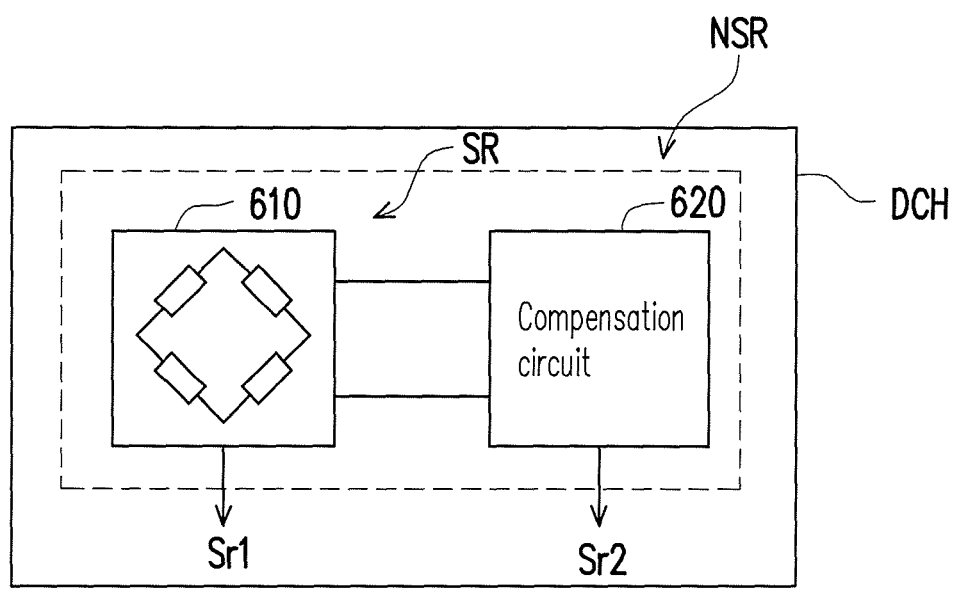
Figure 5C:
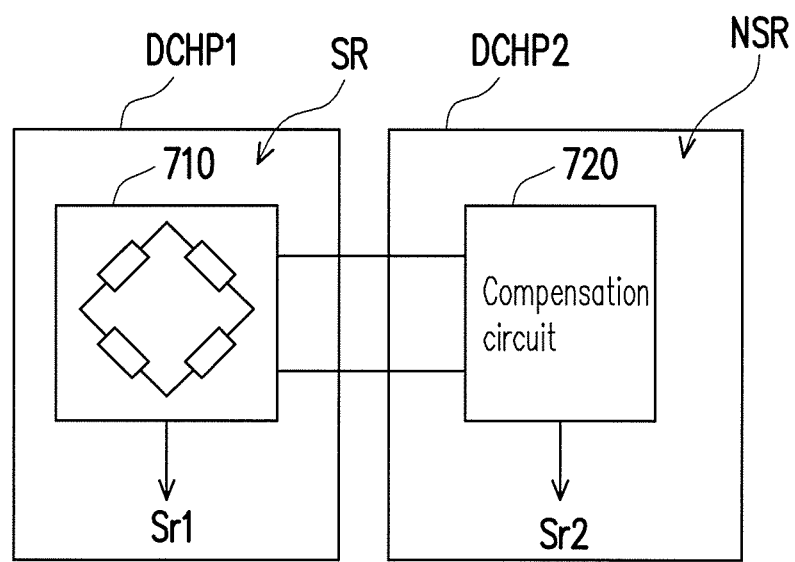

In the present embodiment, circuits inside the impedance sensor may be implemented by using various different hardware configurations, as shown in FIG. 5A to FIG. 5C. In the present embodiment, the impedance-bridge circuit and the compensation circuit are both disposed on a detection carrier DCH. The detection carrier DCH is one of a printed circuit board (PCB) and a micro-electro-mechanical system (MEMS), which is not particularly limited in the invention.

Herein, the detection carrier DCH may be constituted by an integrally formed hardware such as the PCB or the MEMS, or constituted by a plurality of hardware parts which are independent from one another. Based on different structures of the detection carrier DCH, the impedance sensor may have different hardware configurations. The different hardware configurations depicted in FIG. 5A to FIG. 5C are described individually as follows.

Referring to FIG. 5A, the detection carrier DCH includes a sensing region SR and a non-sensing region NSR. In the present embodiment, the sensing region SR and the non-sensing region NSR are defined on the detection carrier DCH that is integrally formed. Herein, the defined sensing region SR refers to a region on the detection carrier DCH that can be easily influenced by the physical pressure, such as a central region inside an area selected by a dot-line box on the detection carrier DCH (but the invention is not limited thereto). In contrast, the defined non-sensing region NSR refers to a region on the detection carrier DCH that cannot be easily influences by the physical pressure, such as a border region outside the area selected by the dot-line box on the detection carrier DCH (but the invention is not limited thereto).

Specifically, the impedance-bridge circuit 510 of the present embodiment is disposed within the sensing region SR, such that the impedance-bridge circuit 510 can detect the physical pressure applied thereon when the physical pressure is applied from the outside. On the other hand, the compensation circuit 520 is disposed outside the sensing region SR of the detection carrier DCH (i.e., the non-sensing region NSR), such that the compensation circuit 520 can generate the impedance variation in response to the temperature variation without being influenced by the physical pressure when the physical pressure is applied from the outside.

Under such configuration, the signal processing circuit that receives the sensing signal Sr1 and the sensing signal Sr2 is able to compensate the sensing signal Sr1 based on the sensing signal Sr2 that is related only to the temperature variation, so as to eliminate the temperature shift part of the sensing signal Sr1.

Referring to FIG. 5B, a difference between the present embodiment and the embodiment of FIG. 5A is that, the compensation circuit 620 and the impedance-bridge circuit 610 are disposed together within the sensing region SR of the detection carrier DCH. In the present embodiment, although the compensation circuit 620 will also be influenced by the physical pressure, the impedance variation of the compensation circuit 620 caused by the physical pressure may be eliminated by the signal processing circuit 130 by performing a correcting operation. Herein, the correcting operation can correct the pressure detection part of the sensing signal Sr2, so that the sensing signal Sr2 can indicate only the temperature shift part. Subsequently, the signal processing circuit that receives the sensing signal Sr1 and the sensing signal Sr2 is able to further generate the pressure detection signal Spd according to the sensing signal Sr1 and the sensing signal Sr2 that is corrected by the correcting operation.

Referring to FIG. 5C, a difference between the present embodiment and the embodiment of FIG. 5A is that, the impedance-bridge circuit 710 and the compensation circuit 720 are respectively disposed on detection carrier parts DCHP1 and DCHP2, wherein each of the detection carrier parts DCHP1 and DCHP2 is an independent hardware part.

In the present embodiment, the detection carrier part DCHP1 may be defined as the sensing region SR, and the detection carrier part DCHP2 may be defined as the non-sensing region NSR. The impedance-bridge circuit 710 is disposed on the detection carrier part DCHP1, and the compensation circuit 720 is disposed on the sensing carrier part DCHP2. Herein, the impedance-bridge circuit 710 and the compensation circuit 720 can be connected to each other through an external line.

It should be noted that, as what must be explained first, the embodiments of FIG. 5A to FIG. 5C are merely used to describe that the impedance sensor of the present application can include different configurations rather than limiting the impedance-bridge circuit and the compensation circuit of the present application only to be disposed by aforesaid architectures.

In summary, the invention proposes an impedance sensor and an electronic apparatus using the same, which are capable of detecting the impedance variation of the compensation circuit in order to compensate the temperature shift of the impedance-bridge circuit, so that the impedance sensor can generate the pressure detection signal that is not influenced by the environment temperature variation. Further, because the impedance sensor of the present application uses the circuit configuration coupled in parallel to the impedance-bridge circuit to realize the temperature shift compensation, no additional voltage drop will be generated by overall operations of the impedance sensor, so as to improve detection sensitivity and resolution of the impedance sensor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An impedance sensor, comprising:
    an impedance-bridge circuit having an input side and an output side, and configured to generate a first impedance variation in response to a physical pressure;
    a compensation circuit, coupled to the input side of the impedance-bridge circuit in parallel, and configured to generate a second impedance variation in response to an environment temperature; and
    a signal processing circuit, coupled to the impedance-bridge circuit and the compensation circuit, and configured to respectively detect the first and the second impedance variations and accordingly generate a first sensing signal indicating the first impedance variation and a second sensing signal indicating the second impedance variation,
    wherein the signal processing circuit performs a signal process according to the first and the second sensing signals, so as to compensate a temperature shift part of the first sensing signal by the second sensing signal and accordingly generate a pressure detection signal.

2. The impedance sensor of claim 1, wherein the impedance-bridge circuit comprises:
    a first impedance component;
    a second impedance component, having a first terminal coupled to a second terminal of the first impedance component;
    a third impedance component, having a first terminal coupled to a first terminal of the first impedance component; and
    a fourth impedance component, having a first terminal coupled to a second terminal of the third impedance component, and a second terminal coupled to a second terminal of the second impedance component,
    wherein the second terminal of the first impedance component and the second terminal of the third impedance component are the input side, and the first terminal of the first impedance component and the second terminal of the second impedance component are the output side.

3. The impedance sensor of claim 2, wherein the compensation circuit comprises:
    a compensation impedor, having a first terminal coupled to the second terminal of the first impedance component and the first terminal of the second impedance component, and a second terminal coupled to the second terminal of the third impedance component and the first terminal of the fourth impedance component.

4. The impedance sensor of claim 1, wherein the signal processing circuit comprises:
    a first detecting unit, coupled to the output side, and configured to detect the first impedance variation and accordingly generate the first sensing signal;
    a second detecting unit, coupled to the compensation circuit, and configured to detect the second impedance variation and accordingly generate the second sensing signal; and
    a compensation calculating unit, coupled to the first detecting unit and the second detecting unit, and configured to generate the pressure detection signal according to the first and the second sensing signals.

5. The impedance sensor of claim 1, further comprising:
    a detection carrier, having a sensing region and a non-sensing region, wherein the sensing region is influenceable by the physical pressure, and the non-sensing region is not influenceable by the physical pressure, wherein the impedance-bridge circuit is disposed within the sensing region.

6. The impedance sensor of claim 5, wherein the compensation circuit is disposed within the non-sensing region.

7. The impedance sensor of claim 5, wherein the compensation circuit is disposed within the sensing region, and the signal processing circuit further performs a correcting operation according to the second sensing signal to correct a pressure detection part included by the second impedance variation and then generate the pressure detection signal according to the first sensing signal and the second sensing signal that is corrected by the correcting operation.

8. The impedance sensor of claim 5, wherein the detection carrier is one of a printed circuit board and a micro-electro-mechanical system.

9. An electronic apparatus, comprising:
an impedance sensor, comprising:
an impedance-bridge circuit having an input side and an output side, and configured to generate a first impedance variation in response to a physical pressure;
a compensation circuit, coupled to the input side of the impedance-bridge circuit in parallel, and configured to generate a second impedance variation in response to an environment temperature; and
a signal processing circuit, coupled to the impedance-bridge circuit and the compensation circuit, and configured to respectively detect the first and the second impedance variations and accordingly generate a first sensing signal indicating the first impedance variation and a second sensing signal indicating the second impedance variation,
wherein the signal processing circuit performs a signal process according to the first and the second sensing signals, so as to compensate a temperature shift part of the first sensing signal by the second sensing signal and accordingly generate a pressure detection signal;
a processing unit, coupled to the impedance sensor to receive the pressure detection signal, and configured to serve as an operation core of the electronic apparatus, wherein the processing unit generates a control signal according to the pressure detection signal; and
at least one function module, coupled to the processing unit, and configured to execute a corresponding function according to the control signal.

10. The electronic apparatus of claim 9, wherein the impedance-bridge circuit comprises:
a first impedance component;
a second impedance component, having a first terminal coupled to a second terminal of the first impedance component;
a third impedance component, having a first terminal coupled to a first terminal of the first impedance component; and
a fourth impedance component, having a first terminal coupled to a second terminal of the third impedance component, and a second terminal coupled to a second terminal of the second impedance component,
wherein the second terminal of the first impedance component and the second terminal of the third impedance component are the input side, and the first terminal of the first impedance component and the second terminal of the second impedance component are the output side.

11. The electronic apparatus of claim 10, wherein the compensation circuit comprises:
a compensation impedor, having a first terminal coupled to the second terminal of the first impedance component and the first terminal of the second impedance component, and a second terminal coupled to the second terminal of the third impedance component and the first terminal of the fourth impedance component.

12. The electronic apparatus of claim 9, wherein the signal processing circuit comprises:
a first detecting unit, coupled to the output side, and configured to detect the first impedance variation and accordingly generate the first sensing signal;
a second detecting unit, coupled to the compensation circuit, and configured to detect the second impedance variation and accordingly generate the second sensing signal; and
a compensation calculating unit, coupled to the first detecting unit and the second detecting unit, and configured to generate the pressure detection signal according to the first and the second sensing signals.

13. The electronic apparatus of claim 9, further comprising:
a detection carrier, having a sensing region and a non-sensing region, wherein the sensing region is influenceable by the physical pressure, and the non-sensing region is not influenceable by the physical pressure, wherein the impedance-bridge circuit is disposed within the sensing region.

14. The electronic apparatus of claim 13, wherein the compensation circuit is disposed within the non-sensing region.

15. The electronic apparatus of claim 13, wherein the compensation circuit is disposed within the sensing region, and the signal processing circuit further performs a correcting operation according to the second sensing signal to correct a pressure detection part included by the second impedance variation and then generate the pressure detection signal according to the first sensing signal and the second sensing signal that is corrected by the correcting operation.

16. The electronic apparatus of claim 13, wherein the detection carrier is one of a printed circuit board and a micro-electro-mechanical system.

* * * * *